No. 672,752. Patented Apr. 23, 1901.
F. COLLINS.
COMBINED TURNING AND LEVELING PLOW.
(Application filed Feb. 9, 1901.)
(No Model.)
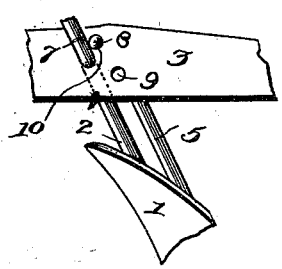
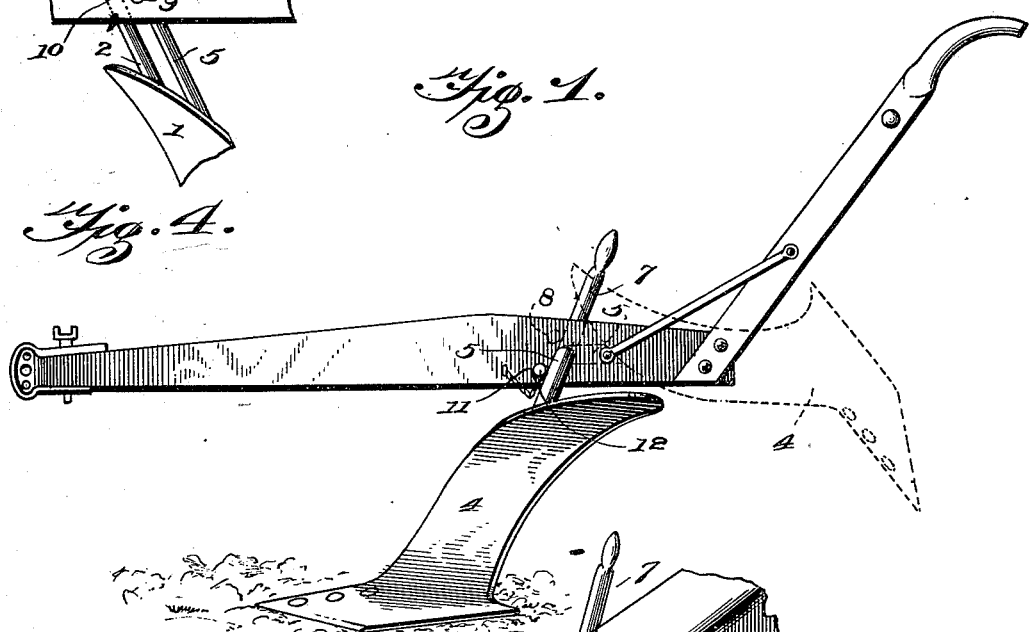
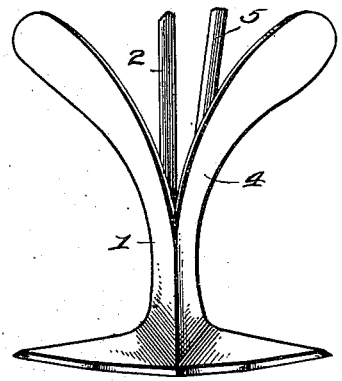
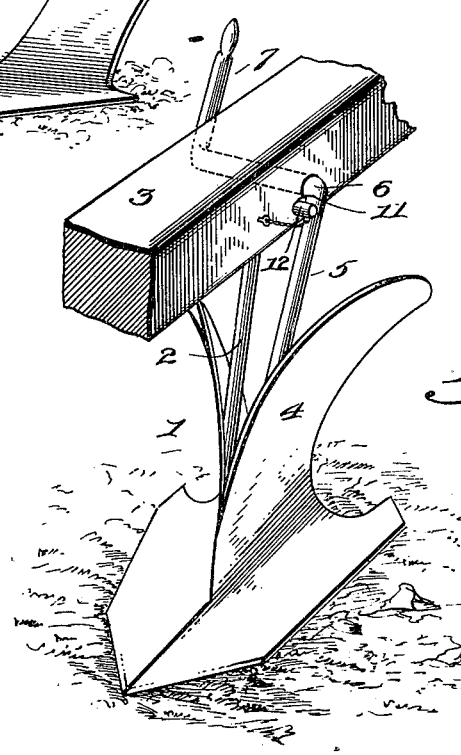
Witnesses
F. Collins, Inventor
Attorneys

UNITED STATES PATENT OFFICE.

FRANK COLLINS, OF AUSTIN, TEXAS.

COMBINED TURNING AND LEVELING PLOW.

SPECIFICATION forming part of Letters Patent No. 672,752, dated April 23, 1901.

Application filed February 9, 1901. Serial No. 46,678. (No model.)

*To all whom it may concern:*

Be it known that I, FRANK COLLINS, a citizen of the United States, residing at Austin, in the county of Travis and State of Texas, have invented a new and useful Combined Turning and Leveling Plow, of which the following is a specification.

My invention is an improved combined turning and leveling plow adapted for use as a turning-plow and also for use as a leveling-plow in leveling the ridges formed during the cultivation of corn, cotton, and other crops; and it consists in the peculiar construction and combination of devices hereinafter fully set forth and claimed.

In the accompanying drawings, Figure 1 is a side elevation of a combined turning and leveling plow constructed in accordance with my invention. Fig. 2 is a detail perspective view of the same. Fig. 3 is a detail front elevation of the same. Fig. 4 is a detail partial side elevation of the same.

In the embodiment of my invention a turning-share 1 has its standard 2 rigidly secured to the beam 3. On the land side of the share 1 is disposed a reversely-formed share 4, the standard 5 of which is pivoted to the beam 3, as at 6, whereby the plow 4 may be turned rearward and raised out of engagement with the earth. A lever 7, with which the pivotal portion 6 of the standard 5 is provided, enables the said plow 4 to be thus disposed either alongside the fixed plow 1 or raised rearward therefrom. The beam 3 on the side proximate to the lever 7 is provided with a pair of openings 8 9. A locking-pin 10 is adapted to be inserted in either of the said openings to engage the lever 7, the said locking-pin and lever coacting to lock the plow 4 either in operative or inoperative position. The standard 5 is disposed on the side of the beam opposite the lever 7 and is provided with an opening 11, in which is a stop-pin 12. The stop-pin by engagement with the front side of the standard arrests the forward movement of the latter when the share 4 is disposed in position abreast of and alongside the fixed plow 1.

It will be observed by reference to the drawings that the fixed and pivoted plows are adapted to throw their furrows in opposite directions. Hence when the plow 4 is secured in position alongside and in contact with the land side of plow 1 my improved plow is adapted for use in breaking down or splitting and leveling the ridges formed in the cultivation of corn, cotton, or other crops. When the pivoted plow 4 is disposed and locked in the position shown in dotted lines in Fig. 1, only the plow 1 is operative and the same is effective for use as an ordinary turning-plow.

In carrying out my invention I attach my pivoted plow 4 to an ordinary turning-plow, and hence adapt the latter for use either as a turning-plow or as a leveling-plow.

Having thus described my invention, I claim—

1. A turning-plow having a fixed share, in combination with a reversely-disposed share having its standard pivotally connected to the beam, the said pivotally-attached share being adapted to be disposed on the land side of the fixed turning-share and to coact therewith as a leveling-plow, substantially as described.

2. The combination of a beam, a turning-plow having its standard rigidly secured to the beam, a pivoted standard disposed on one side of the beam and having the axial portion 6 pivoted therein and provided with the lever 7, the said pivoted plow being thereby adapted to be placed alongside the turning-plow or moved rearwardly and elevated therefrom, a stop-pin 12 on one side of the beam to engage the pivoted standard for the purpose set forth and an adjustable stop-pin 10 on the opposite side of the beam to engage the lever 7, substantially as described.

In testimony that I claim the foregoing as my own I have hereto affixed my signature in the presence of two witnesses.

FRANK COLLINS.

Witnesses:
J. S. AHART,
SALLIE COLLINS.